United States Patent
Crane

(10) Patent No.: US 8,079,227 B2
(45) Date of Patent: Dec. 20, 2011

(54) REDUCED COMPRESSOR CAPACITY CONTROLS

(75) Inventor: Curtis Christian Crane, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 1023 days.

(21) Appl. No.: 11/422,762

(22) Filed: Jun. 7, 2006

(65) Prior Publication Data

US 2007/0151264 A1 Jul. 5, 2007

Related U.S. Application Data

(60) Provisional application No. 60/754,765, filed on Dec. 29, 2005.

(51) Int. Cl.
F25B 49/00 (2006.01)
F25B 49/02 (2006.01)

(52) U.S. Cl. .................. 62/157; 62/228.1; 62/230

(58) Field of Classification Search .......... 62/157, 62/228.1, 230
See application file for complete search history.

(56) References Cited

U.S. PATENT DOCUMENTS

| | | | |
|---|---|---|---|
| 3,844,130 A * | 10/1974 | Wahnish | 62/133 |
| 3,890,798 A * | 6/1975 | Fujimoto et al. | 62/155 |
| 4,227,862 A * | 10/1980 | Andrew et al. | 417/12 |
| 4,259,845 A * | 4/1981 | Norbeck | 62/209 |
| 4,297,852 A * | 11/1981 | Brooks | 62/153 |
| 4,336,001 A * | 6/1982 | Andrew et al. | 417/63 |
| 4,392,877 A * | 7/1983 | Funk | 62/628 |
| 4,480,442 A | 11/1984 | Ide et al. | |
| 4,530,738 A * | 7/1985 | Funk | 203/2 |
| 4,932,220 A | 6/1990 | Inoue | |
| 5,107,684 A | 4/1992 | Nakayama et al. | |
| 5,170,636 A | 12/1992 | Hitosugi | |
| 5,316,074 A | 5/1994 | Isaji et al. | |
| 5,678,985 A | 10/1997 | Brooke et al. | |
| 5,931,011 A * | 8/1999 | Shima et al. | 62/182 |
| 6,102,114 A | 8/2000 | Nishihara et al. | |
| 6,109,533 A | 8/2000 | Ao et al. | |
| 6,539,736 B1 | 4/2003 | Isazawa et al. | |
| 6,568,197 B2 | 5/2003 | Uno et al. | |
| 6,672,089 B2 * | 1/2004 | Park et al. | 62/199 |
| 7,621,140 B2 * | 11/2009 | Schnell et al. | 62/157 |
| 7,886,553 B2 * | 2/2011 | Joergensen et al. | 62/230 |
| 2002/0043072 A1 * | 4/2002 | Hamachi et al. | 62/230 |
| 2002/0066422 A1 * | 6/2002 | Hawkins et al. | 123/41.12 |

(Continued)

FOREIGN PATENT DOCUMENTS

EP 0781926 A1 7/1997

(Continued)

Primary Examiner — Judy Swann
Assistant Examiner — Alexis Cox
(74) Attorney, Agent, or Firm — McNees Wallace & Nurick LLC

(57) ABSTRACT

A method of controlling the frequency of a compressor in a chiller system is disclosed. The method includes determining a nominal minimum frequency of a compressor, and providing a control algorithm for controlling the period of time and the deviation of the actual operating frequency below the nominal minimal frequency that the compressor may operate without shutting down the chiller system. The time period of operation below nominal minimum frequency may be predetermined as a fixed time period of operation below nominal minimum frequency, or as a variable time period based on the amount by which the frequency deviates below nominal minimum frequency. Also, an absolute minimum operating frequency is provided that results in the control algorithm shutting down the chiller system and the compressor.

20 Claims, 5 Drawing Sheets

U.S. PATENT DOCUMENTS

2002/0148242 A1* 10/2002 Goto et al. .................... 62/230
2004/0093893 A1   5/2004 Tanimoto et al.
2005/0160748 A1*  7/2005 Shaffer et al. ............... 62/228.1
2009/0216379 A1*  8/2009 Smith ........................... 700/275
2009/0297333 A1* 12/2009 Mirsky et al. ................. 415/26

FOREIGN PATENT DOCUMENTS

JP         59056648 A2    4/1984

* cited by examiner

REDUCED COMPRESSOR CAPACITY CONTROLS

CROSS-REFERENCE TO RELATED APPLICATIONS

This patent application claims the benefit of U.S. Provisional Patent Application Ser. No. 60/754,765, filed Dec. 29, 2005.

FIELD OF THE INVENTION

The present invention is directed to a control algorithm for controlling the capacity of a compressor, and more particularly to a control algorithm for reducing the capacity of a compressor in a chiller system below the nominal minimum capacity of the compressor.

BACKGROUND OF THE INVENTION

Refrigeration systems or chiller systems typically include a motor driven compressor, condenser, and evaporator in a closed refrigeration loop. Variable speed drives (VSDs) are used in many instances to power the compressor motor. The voltage and frequency of the AC voltage is varied at the output of the VSD to vary the speed of the compressor motor. In large compressors for use in commercial, industrial and large HVAC&R systems in particular, the compressor manufacturer typically sets forth a minimum rotational frequency of the compressor. This limitation is established by the manufacturer primarily to ensure sufficient lubrication for bearings in the compressor in addition to other considerations. The bearings and other moving parts are lubricated by oil circulating within the compressor. As the compressor speed decreases, the amount of oil available for lubrication is reduced.

In order to prevent damage to the compressor bearings and other moving parts due to insufficient lubrication, the manufacturers normally set forth a minimum operating rotational frequency for each compressor. This minimum operating rotational frequency, also referred to as the nominal minimum compressor frequency, is normally monitored by the chiller control system. As a precautionary measure, the control system shuts down the compressor in response to sensing the operating frequency drop below the nominal minimum frequency. This limitation can be problematic, for example, where the compressor speed is controllably reduced due to a temporary reduction in cooling demand. In some instances, the compressor frequency may drop below the nominal minimum frequency for only a brief period, or the compressor frequency may be controlled at a frequency below the nominal minimum frequency by a very small margin. In such a case, the risk of overheating the bearings due to a lack of lubrication is generally minimal, and the inconvenience and expense of restarting the chiller system outweighs the potential benefit of the system shutdown.

Therefore, there is a need for a control system that controls the actual operating frequency of the compressor below the minimum operating rotational frequency for a short period before turning the compressor off.

SUMMARY OF THE INVENTION

One embodiment of the present invention is directed to a method of controlling the frequency of a compressor in a chiller system. The method includes the steps of monitoring an operating frequency of a compressor; comparing the operating frequency to a nominal minimum frequency for the compressor; comparing the operating frequency to a predetermined absolute minimum frequency for the compressor in response to the operating frequency being less than the nominal minimum frequency, the predetermined absolute minimum frequency being less than the nominal minimum frequency; operating the compressor for a predetermined time period in response to the operating frequency being less than the nominal minimum frequency and the operating frequency being greater than or equal to the predetermined absolute minimum frequency, and shutting down the compressor in response to an expiration of the predetermined time period of the operating frequency being less than the nominal minimum frequency.

Another embodiment of the present invention is directed to a chiller system. The chiller system includes a refrigerant circuit having a compressor, a condenser arrangement and an evaporator arrangement connected in a closed refrigerant loop. The chiller system also includes a drive arrangement connected to the compressor to power the compressor. The drive arrangement has a motor, a variable speed drive, and a controller for controlling the frequency of the compressor.

The controller is configured to monitor an operating frequency of the compressor and compare the operating frequency to a nominal minimum frequency for the compressor. The controller compares the operating frequency to a predetermined absolute minimum frequency for the compressor in response to the operating frequency being less than the nominal minimum frequency. The predetermined absolute minimum frequency is less than the nominal minimum frequency. The controller operates the compressor for a predetermined time period in response to the operating frequency being less than the nominal minimum frequency and the operating frequency being greater than or equal to the predetermined absolute minimum frequency. The controller shuts down the compressor in response to an expiration of the predetermined time period of the operating frequency being less than the nominal minimum frequency.

The predetermined period of time of operation below the nominal minimum frequency may be a fixed time period of operation below the nominal minimum frequency. Alternately, the predetermined period of time of operation below the nominal minimum frequency may be a variable time period based on the amount by which the frequency deviates below the nominal minimum frequency.

Also, the present invention contemplates an absolute minimum operating frequency, below which a control algorithm shuts downs the chiller system and the compressor.

In one aspect of the invention, the control algorithm monitors the time period during which the actual operating frequency falls below nominal minimum frequency. If the time period exceeds a predetermined interval, e.g., 5 or 10 minutes, then the algorithm performs a controlled chiller system shutdown. Generally, the permitted deviation of the actual operating frequency below the nominal minimum frequency is also limited—e.g., 10 Hz or 20% of nominal minimum frequency, and any further decrease in the actual operating frequency supercedes the timing cycle limit, causing the control algorithm to initiate a controlled shutdown of the chiller system.

In another aspect of the invention, the control algorithm controls the time period of operation below the nominal minimum frequency, based on the magnitude of the deviation of the actual operating frequency below the nominal minimum frequency. In this embodiment of the invention, the algorithm controls smaller deviations for a longer operating time period below the nominal minimum frequency, while larger deviations below the nominal minimum frequency are controlled for a shorter operating time period. The control algorithm would also aggregate fluctuations in operating frequency for an intermediate time period, which intermediate time period being computed with respect to a fundamental maximum parameter. The maximum parameter may be computed as a function of Hz-seconds, for example.

The present invention is also directed to a computer program product embodied on a computer readable medium and executable by a microprocessor for controlling the frequency of a compressor in a chiller system. The computer program product includes computer instructions for executing the steps of: monitoring an operating frequency of a compressor; comparing the operating frequency to a nominal minimum frequency for the compressor; comparing the operating frequency to a predetermined absolute minimum frequency for the compressor, the predetermined absolute minimum frequency being less than the nominal minimum frequency; operating the compressor for a predetermined time period in respect to the operating frequency being less than the nominal minimum frequency and the operating frequency being greater than the predetermined absolute minimum frequency; and shutting down the compressor in response to an expiration of the predetermined time period wherein the operating frequency is less than the predetermined absolute minimum frequency.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
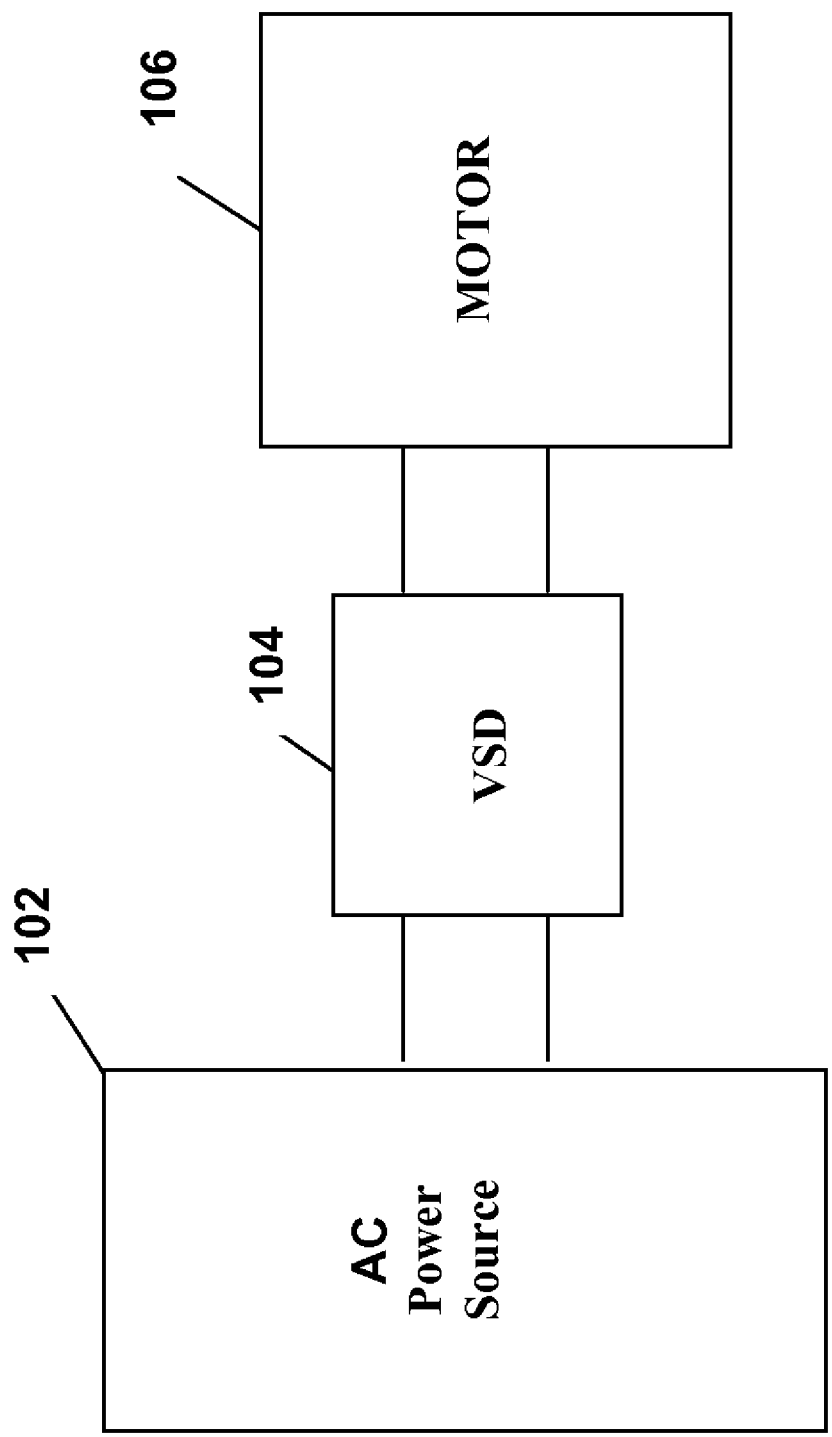
FIG. 1 illustrates schematically a general system configuration of the present invention.

FIG. 1 illustrates generally the system configuration of the present invention. An AC power source 102 supplies AC power to a variable speed drive (VSD) 104, which in turn, supplies AC power to a motor 106. In another embodiment of the present invention, the VSD 104 can power more than one motor. The motor 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site.

Figure 2:
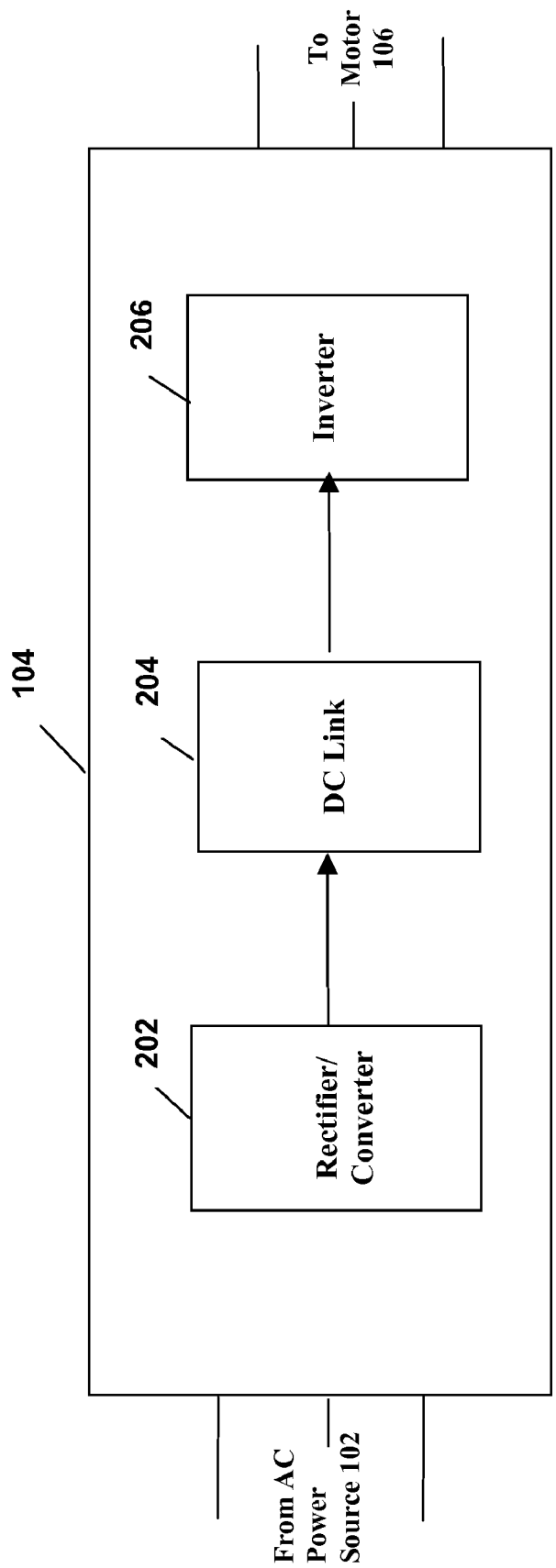
FIG. 2 illustrates schematically one embodiment of a variable speed drive used in the present invention.

The VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the AC power source 102. FIG. 2 illustrates schematically some of the components in one embodiment of the VSD 104. The VSD 104 can have three stages: a converter stage 202, a DC link stage 204 and an inverter stage 206. The converter 202 converts the fixed line frequency, fixed line voltage AC power from the AC power source 102 into DC power. The DC link 204 filters the DC power from the converter 202 and provides energy storage components such as capacitors and/or inductors. Finally, the inverter 206 converts the DC power from the DC link 204 into variable frequency, variable voltage AC power for the motor 106. Since the VSD 104 can provide a variable input voltage and variable input frequency to the motor 106, the motor can be operated at a variety of different levels in the constant flux or constant volts/Hz mode depending on the particular load of the motor.

The converter 202 can be a pulse width modulated boost rectifier to provide a boosted DC voltage to the DC link 204 to obtain an output voltage from the VSD 104 greater than the input voltage of the VSD 104. Alternately, the converter 202 can be a diode or thyristor rectifier, possibly coupled to a boost DC/DC converter to provide a boosted DC voltage to the DC link 204 in order to obtain an output voltage from the VSD 104 greater than the input voltage of the VSD 104. Furthermore, it is to be understood that the VSD 104 can incorporate different components from those shown in FIG. 2 so long as the VSD 104 can provide the motor 106 with appropriate output voltages and frequencies.

The motor 106 is preferably an induction motor that is capable of being driven at variable speeds. The induction motor can have any suitable pole arrangement including two poles, four poles or six poles. The induction motor is used to drive a load, preferably a compressor of a refrigeration system as shown in FIG. 3.

Figure 3:
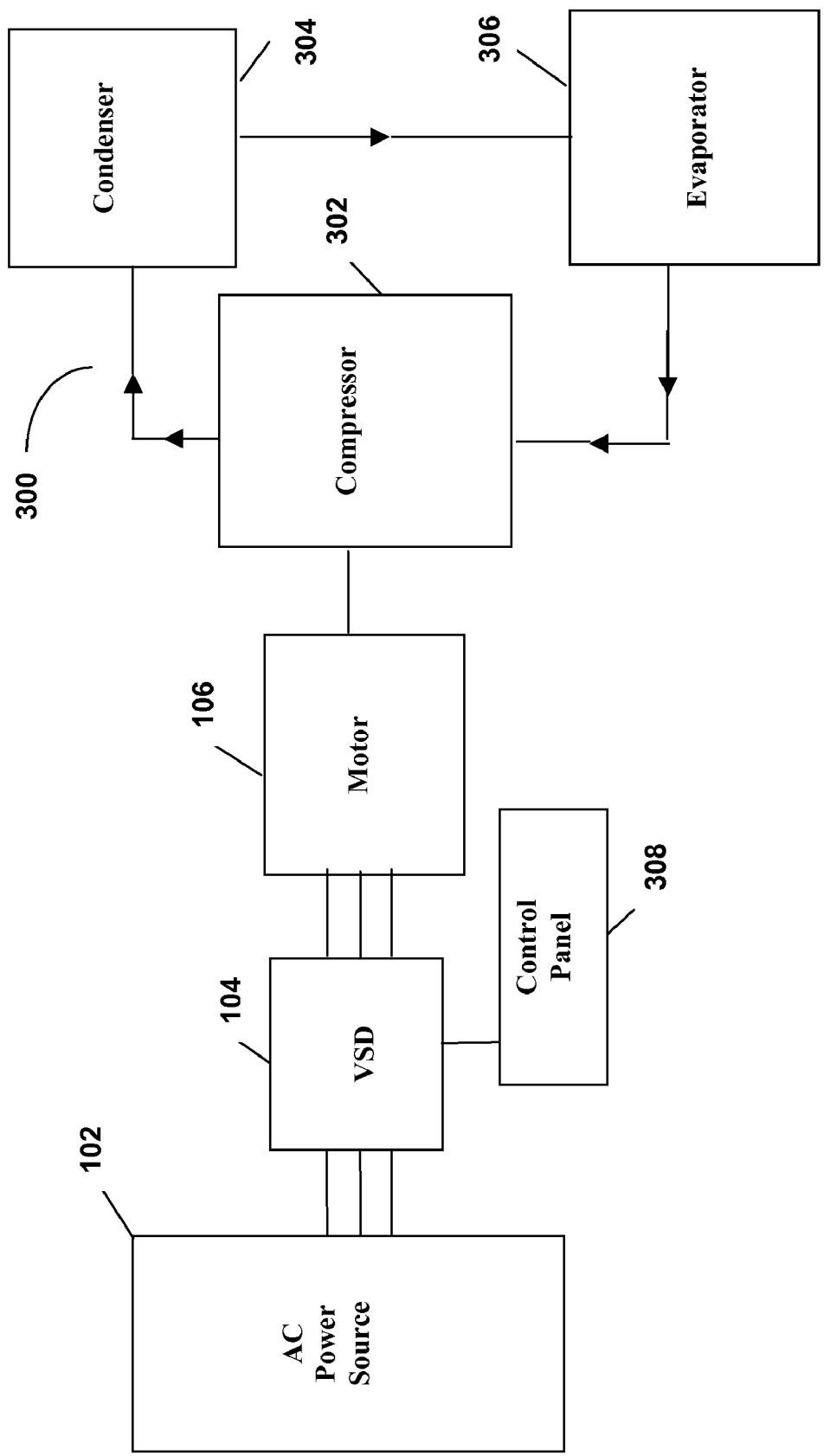
FIG. 3 illustrates schematically a refrigeration system that can be used with the present invention.

As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104 and the motor 106. The conventional refrigeration system 300 includes many other features that are not shown in FIG. 3. These features have been purposely omitted to simplify the drawing for ease of illustration.

Compressor 302 compresses a refrigerant vapor and delivers the vapor to the condenser 304 through a discharge line. The compressor 302 is preferably a screw compressor, but can be any suitable type of compressor, e.g., centrifugal compressor, reciprocating compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs, connected into each of one or more refrigerant circuits.

Preferably, the control panel, microprocessor or controller 308 can provide control signals to the VSD 104 to control the operation of the VSD 104 (and possibly motor 106) to provide the optimal operational setting for the VSD 104 and motor 106 depending on the particular sensor readings received by the control panel 308. The control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired load output of the compressor 302.

If necessary, the signal(s) input to control panel 308 over a signal cable(s) is converted to a digital signal or word by an A/D converter. The digital signal (either from the A/D converter or from the sensor) is then input into the control algorithm, which is described in more detail in the following paragraphs, to generate an appropriate control signal as discussed below.

The control signal is provided to the interface board of the control panel 308 by the microprocessor (not shown), as appropriate, after executing the control algorithm. The interface board (not shown) then provides the control signals to the VSD 104 and the compressor 302.

The microprocessor or control panel 308 uses a control algorithm to determine when to shut down the compressor 302 or begin a timer sequence for low frequency operation. In one embodiment, the control algorithm can be a computer program having a series of instructions executable by the microprocessor. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 308 can be changed to incorporate the necessary components and to remove any components that may no longer be required, e.g. the A/D converter.

Generally, the control panel 308 executes a capacity control program that controls the compressor 302 or multiple compressors, if present, during normal operation. If there are multiple compressors in the system, the capacity control program controls the system capacity by turning on or off any compressors that are not needed to satisfy the capacity demand. When only one compressor is operating, if the cooling demand begins to decrease, the reduced capacity control system of the present invention overrides the shutdown controls of the capacity control program in response to the capacity control program having an operating frequency, which corresponds to the decreased demand, below the minimum frequency.

Figure 4:
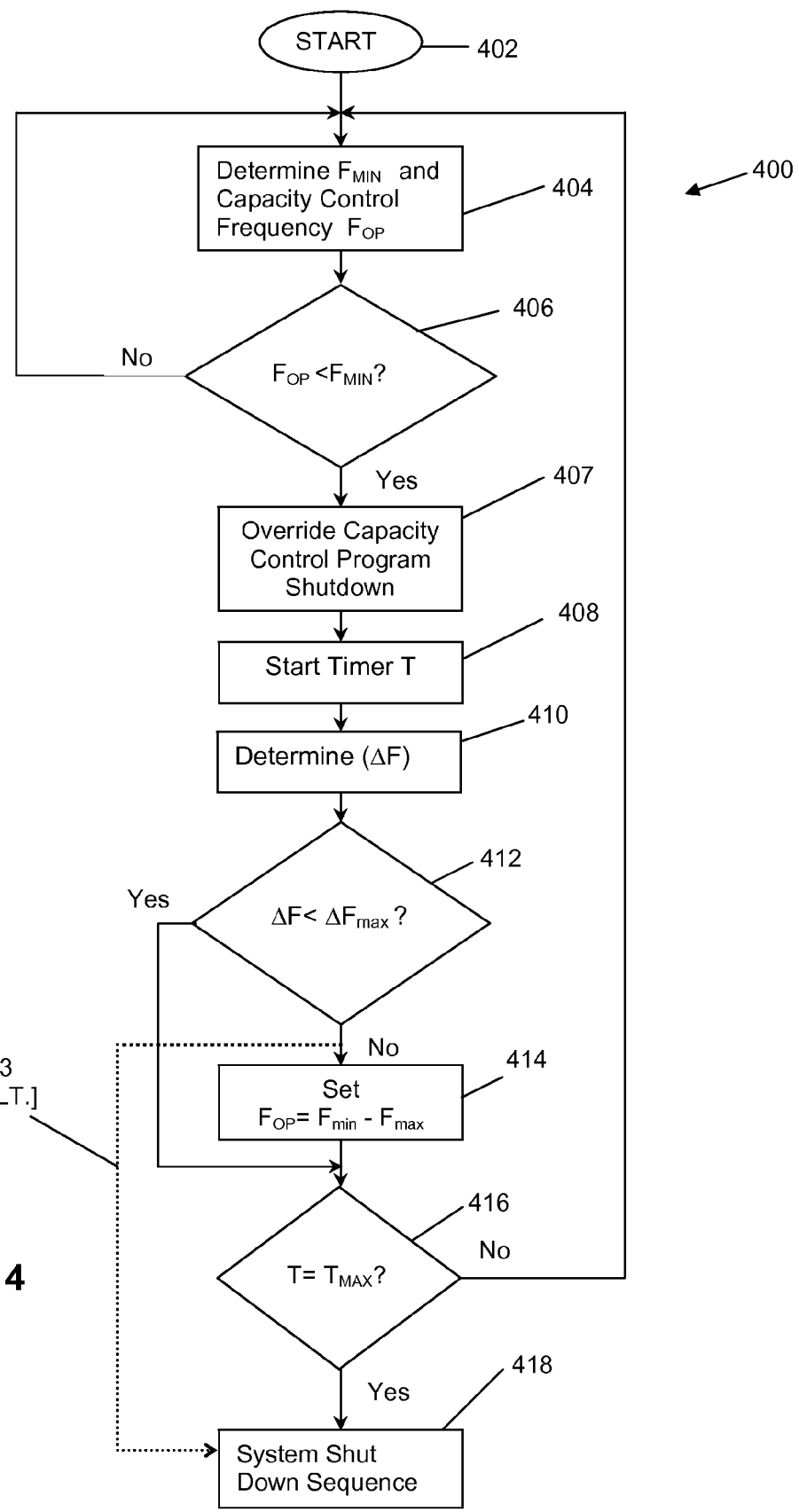
FIG. 4 illustrates a flow chart of one embodiment of the present invention.

Referring next to FIG. 4, a flow chart for a preferred embodiment of the control process of the present invention is generally designated as 400. The system starts at Step 402, preferably within a short period of time after starting the chiller system. The system then proceeds to Step 404 and loads the minimum frequency, $F_{min}$, as established by the compressor manufacturer. In this example, $F_{min}$ is 50 Hz, which is a nominal minimum operating frequency for some screw compressors. The system also has control panel 308 determine the operating frequency $F_{OP}$ set by the capacity control program. The capacity control program loads and unloads the compressor as necessary. Next, the system proceeds to Step 406, to determine whether the actual operating frequency, $F_{OP}$, established by the capacity control program is less than $F_{min}$. If $F_{OP}$ is not less than $F_{min}$, the system resets a timer T (discussed below) and returns to Step 404 to measure the operating frequency again; however, if the actual operating frequency $F_{OP}$ is below $F_{min}$, then the system proceeds to Step 407. In Step 407, the system overrides the chiller capacity control program to prevent shutdown of the compressor in response to the low operating frequency and starts a low frequency control program. At Step 408, the system starts timer T to begin counting if timer T has not been previously started.

Next, the system then proceeds to Step 410 and determines the frequency deviation ΔF relative to the nominal minimum frequency, $F_{min}$, i.e., $\Delta F = F_{min} - F_{op}$. Next the system proceeds to Step 412 to determine whether the deviation in the frequency, ΔF, is less than a predetermined frequency difference $\Delta F_{max}$, e.g., 10 Hz, which, in this example, corresponds to an actual operating frequency of about 40 Hz. Alternately, an absolute minimum frequency may be set as a percentage, e.g., about 80%—in a range of percentages from about 60% to about 95% of nominal minimum frequency. If ΔF is greater than or equal to $\Delta F_{max}$ in step 412 then the system proceeds to step 414 where the compressor operating frequency, Fop, is set to $F_{min} - \Delta F_{max}$ and the compressor is prevented from further unloading. The system then proceeds to step 416 to determine if the maximum allowable time has elapsed. If ΔF is less than $\Delta F_{max}$ in step 412, then the system proceeds to step 416 to determine if the maximum allowable time has elapsed. Once the compressor has been operating at less than $F_{min}$ for the maximum allowable time $T_{MAX}$ in step 416, the compressor enters the shut down sequence and shuts off in step 418. If the compressor has not been operating for the maximum allowable time in step 416, the control returns to step 404 to begin again. The maximum allowable time is preferably set between five and ten minutes.

In an alternate embodiment, shown by broken line 413, if ΔF is not less than $\Delta F_{max}$ in step 412 then the compressor enters the shut down sequence and shuts off in step 418, and the intermediate steps 414, 416 are omitted.

Figure 5:
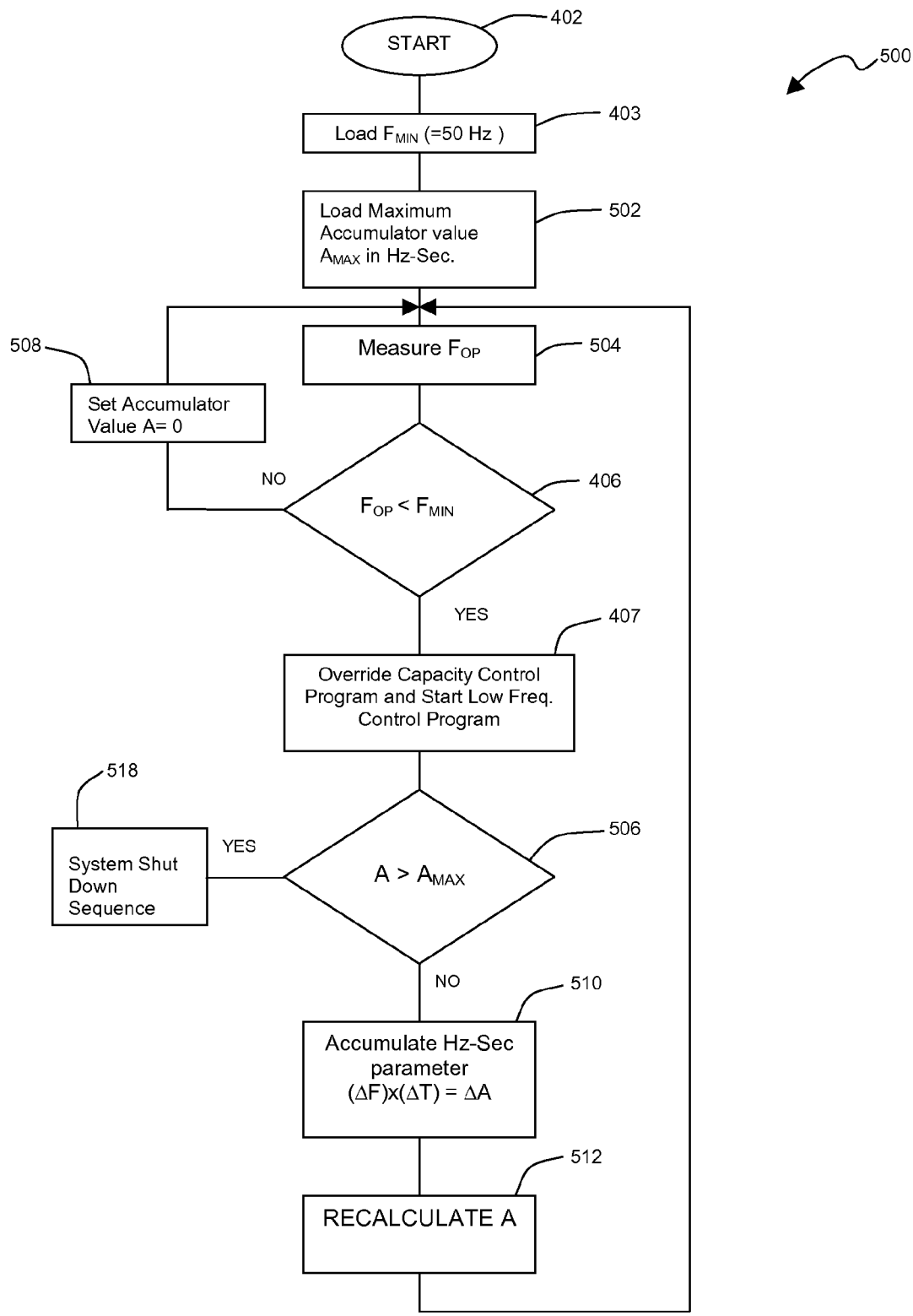
FIG. 5 illustrates a partial flow chart of a preferred embodiment of the present invention.

Referring next to FIG. 5, a flow chart of another preferred embodiment is illustrated. The flow chart is generally designated as 500. The system starts at Step 402, preferably within a short period of time after starting the chiller system. The system then proceeds to Step 403 and loads the minimum frequency $F_{min}$ as established by the compressor manufacturer. The system then proceeds to Step 502 to load or determine a maximum accumulated value $A_{max}$ in Hz-seconds. $A_{max}$ represents a predetermined maximum threshold parameter corresponding to the frequency deviation in Hz, multiplied by a time period, for tracking and limiting the total amount of operating time at a frequency below $F_{min}$, as a function of the magnitude of the deviation. In other words, the smaller the frequency deviation, the greater the amount of time that the system may operate at a frequency below $F_{min}$ and similarly the larger the deviation, the shorter amount of time the system may operate below $F_{min}$. Next, at Step 504, the system measures the operating frequency $F_{OP}$. The system then proceeds to Step 406 to determine if $F_{OP}$ is less than $F_{min}$. If $F_{OP}$ is lower than $F_{min}$, in Step 406, the system proceeds to Step 407. Otherwise, the system resets the accumulator value A to zero at step 508 and returns to Step 504.

In Step 407, the system overrides the chiller capacity control program to prevent shutdown in response to the low capacity demand and starts a low frequency control program. The system then proceeds to Step 506. At Step 506, the accumulator value A is compared to $A_{max}$; if A is greater than $A_{max}$, then the system proceeds to Step 518 and initiates a system shut down sequence. Otherwise, the system proceeds to Step 510 and calculates $\Delta A$, the accumulated parameter in Hz-Seconds. The frequency deviation in the current iteration is defined as $\Delta F$, wherein $\Delta F$ is the difference between $F_{OP}$ and $F_{min}$. $\Delta F$ times the iteration interval is defined as $\Delta A$. This value $\Delta A$ represents the incremental time-frequency value since the last sampled value of the previous iteration. Next, the system proceeds to Step 512 to calculate an updated value of A by adding the incremental accumulated value $\Delta A$ to the previous value of A. Then the system returns to Step 504 for another iteration. Preferably, the iteration or cycle time is repeated at a constant frequency or period.

The low frequency control system of FIG. 4 or FIG. 5 may be embodied in a computer program as a standalone system, or may be incorporated into a larger system, e.g., a capacity control program.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of controlling the frequency of a compressor comprising:
   executing a capacity control program, the capacity control program establishing an operating frequency of a compressor;
   comparing the operating frequency to a nominal minimum frequency for the compressor, the nominal minimum frequency for the compressor being established by a manufacturer of the compressor;
   comparing the operating frequency to a predetermined minimum frequency for the compressor in response to the operating frequency being less than the nominal minimum frequency, the predetermined minimum frequency being less than the nominal minimum frequency; and
   overriding the capacity control program in response to the operating frequency being less than the nominal minimum frequency, overriding the capacity control program comprising:
      operating the compressor for a predetermined time period in response to the operating frequency remaining less than the nominal minimum frequency and the operating frequency remaining greater than or equal to the predetermined minimum frequency; and
      shutting down the compressor in response to an expiration of the predetermined time period.

2. The method as set forth in claim 1, wherein overriding the capacity control program comprises setting the operating frequency of the compressor to the predetermined minimum frequency in response to the operating frequency being less than the predetermined minimum frequency.

3. The method as set forth in claim 1, wherein the predetermined time period is a fixed time period of operation.

4. The method as set forth in claim 3, wherein the fixed time period is in the range of five to ten minutes.

5. The method as set forth in claim 1, further comprising selecting the predetermined time period based on an amount the operating frequency is below the nominal minimum frequency.

6. The method as set forth in claim 1, further comprising calculating the predetermined minimum frequency as a function of the nominal minimum frequency.

7. The method of claim 6, wherein calculating the predetermined minimum frequency comprises subtracting a predetermined amount from the nominal minimum frequency.

8. The method as set forth in claim 6, wherein calculating the predetermined minimum frequency comprises multiplying the nominal minimum frequency by a predetermined percentage.

9. The method as set forth in claim 8, wherein the predetermined percentage is about 80%.

10. The method as set forth in claim 1, further comprising resetting the predetermined time period in response to the operating frequency being greater than the nominal minimum frequency.

11. The method as set forth in claim 5, wherein selecting the predetermined time period comprises:
    calculating a frequency deviation by subtracting the operating frequency from the nominal minimum frequency for the compressor; and
    calculating the predetermined time period with the calculated frequency deviation, wherein the calculated predetermined time period is inversely proportional to a magnitude of the calculated frequency deviation, the calculated predetermined time period for a first calculated frequency deviation is greater than the calculated predetermined time period for a second calculated frequency deviation in response to the second calculated frequency deviation being greater than the first calculated frequency deviation.

12. The method as set forth in claim 5, wherein selecting the predetermined time period comprises:
    calculating a frequency deviation by subtracting the operating frequency from the nominal minimum frequency for the compressor;
    determining a parameter by multiplying the calculated frequency deviation by a corresponding time interval;
    adding the determined parameter to a sum of previously determined parameters;
    comparing the added parameters to a predetermined maximum parameter; and
    wherein the predetermined time period expires in response to the added parameters being greater than the predetermined maximum parameter.

13. The method as set forth in claim 1, wherein the nominal minimum frequency is 50 Hz.

14. The method as set forth in claim 7, wherein the predetermined amount is about 10 Hz.

15. A system comprising:
- a refrigerant circuit comprising a compressor, a condenser and an evaporator connected in a closed loop;
- a motor connected to the compressor to power the compressor and a variable speed drive connected to the motor to power the motor;
- a controller for controlling the frequency of the compressor, the controller configured to:
  - monitor an operating frequency of the compressor, the operating frequency of the compressor being determined by a capacity control program;
  - compare the operating frequency to a nominal minimum frequency for the compressor, the nominal minimum frequency for the compressor being established by a manufacturer of the compressor;
  - compare the operating frequency to a predetermined minimum frequency for the compressor in response to the operating frequency being less than the nominal minimum frequency, the predetermined minimum frequency being less than the nominal minimum frequency;
  - operate the compressor for a predetermined time period in response to the operating frequency remaining less than the nominal minimum frequency and the operating frequency remaining greater than or equal to the predetermined minimum frequency; and
  - shut down the compressor in response to an expiration of the predetermined time period.

16. The system of claim 15, wherein the predetermined time period is a fixed time period of operation.

17. The system of claim 15, wherein the predetermined time period is selected based on an amount the operating frequency deviates from the nominal minimum frequency.

18. The system of claim 15, wherein the predetermined minimum frequency is selected to be about 10 Hz below the nominal minimum frequency.

19. The system of claim 15, wherein the predetermined minimum frequency is selected to be about 80% of the nominal minimum frequency.

20. The system of claim 15, wherein the controller is further configured to reset the predetermined time period in response to the operating frequency being greater than the nominal minimum frequency.

* * * * *